United States Patent
Hu et al.

(10) Patent No.: US 10,744,516 B2
(45) Date of Patent: Aug. 18, 2020

(54) ELECTROSTATIC DUST COLLECTING MODULE AN ELECTROSTATIC AIR PURIFIER THEREOF

(71) Applicant: Ningbo Zhekai Electric Co., Ltd., Cixi (CN)

(72) Inventors: Hairong Hu, Cixi (CN); Zhangbin Xiao, Cixi (CN)

(73) Assignee: Ningbo Zhekai Electric Co., Ltd., Cixi (CN)

(*) Notice: Subject to any disclaimer, the term of this patent is extended or adjusted under 35 U.S.C. 154(b) by 640 days.

(21) Appl. No.: 15/532,296

(22) PCT Filed: Dec. 18, 2015

(86) PCT No.: PCT/CN2015/000910
§ 371 (c)(1),
(2) Date: Jun. 1, 2017

(87) PCT Pub. No.: WO2017/091922
PCT Pub. Date: Jun. 8, 2017

(65) Prior Publication Data
US 2020/0139381 A1 May 7, 2020

(30) Foreign Application Priority Data

Dec. 3, 2015 (CN) .......................... 2015 1 0881195

(51) Int. Cl.
*B03C 3/08* (2006.01)
*B03C 3/47* (2006.01)
(Continued)

(52) U.S. Cl.
CPC .................. *B03C 3/08* (2013.01); *B03C 3/47* (2013.01); *B03C 3/64* (2013.01); *B03C 3/82* (2013.01)

(58) Field of Classification Search
CPC combination set(s) only.
See application file for complete search history.

(56) References Cited

U.S. PATENT DOCUMENTS

| 8,192,535 B2 * | 6/2012 | Tanaka | ...................... B03C 3/09 96/98 |
| 8,192,536 B2 * | 6/2012 | Tanaka | ...................... B03C 3/09 96/98 |

(Continued)

FOREIGN PATENT DOCUMENTS

WO  WO-2008010458 A1 * 1/2008 ............... B03C 3/47

*Primary Examiner* — Christopher P Jones
*Assistant Examiner* — Sonji Turner
(74) *Attorney, Agent, or Firm* — Wang Law Firm, Inc.

(57) ABSTRACT

An electrostatic precipitation module includes a plurality of conductive precipitation electrode plates and a plurality of non-precipitation electrode plates. The plurality of precipitation electrode plates are interlacedly distributed along the length of a first connecting rib; the precipitation electrode plates are made from conductive plastic material by injection molding, and a metal conductor is embedded inside the first connecting rib by in-mold injection molding, so that a precipitation electrode plate module is formed; a non-precipitation electrode plate module is formed with a similar structure. After the precipitation electrode plate module and the non-precipitation electrode plate module are assembled, the precipitation electrode plates and the non-precipitation electrode plates form an electrostatic precipitation module. Together they form an electrostatic air purifier using the electrostatic precipitation modules which can be assembled quickly, improves the uniformity of electric field distribution and has excellent electrostatic absorption performance.

6 Claims, 8 Drawing Sheets

(51) Int. Cl.
*B03C 3/82* (2006.01)
*B03C 3/64* (2006.01)

(56) References Cited

U.S. PATENT DOCUMENTS 8,657,937 B2 * 2/2014 Motegi .................. B03C 3/011
  96/100
9,457,118 B2 * 10/2016 Ota ........................... B03C 3/09

* cited by examiner

Circulated Flow

FIG.8

Prior Art

ELECTROSTATIC DUST COLLECTING MODULE AN ELECTROSTATIC AIR PURIFIER THEREOF

CROSS-REFERENCE TO RELATED APPLICATIONS

This application is a national phase entrance of and claims benefit to PCT Application for an electrostatic precipitation module and an electrostatic air purifier thereof, PCT/CN2015/000910, filed on Dec. 18, 2015, which claims benefit to Chinese Patent Application 201510881195.X, filed on Dec. 3, 2015. The specifications of both applications are incorporated herein by this reference.

TECHNICAL FIELD OF THE INVENTION

The present invention relates to the technical field of electrostatic precipitation, and in particular to an electrostatic precipitation module and an electrostatic air purifier thereof.

BACKGROUND OF THE INVENTION

Figure 9A:
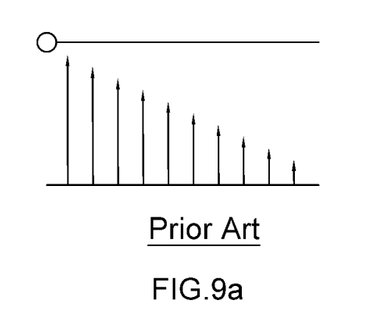
FIG. 9a is a diagram of the electric field distribution of a conventional electrostatic precipitation module.
Figure 9B:
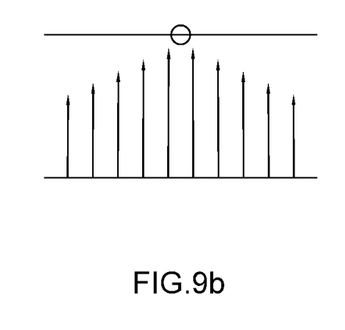
FIG. 9b is a diagram of the electric field distribution of the electrostatic precipitation module according to the embodiment of the present invention.
Figure 10:
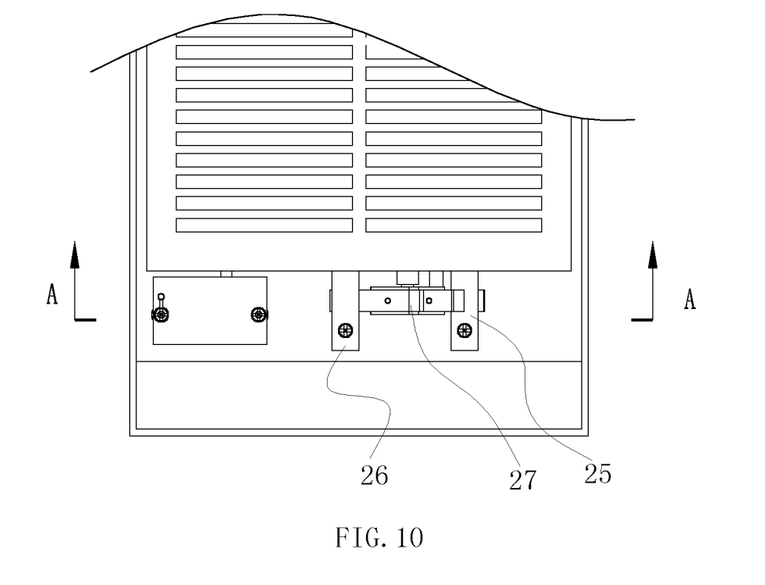
FIG. 10 is a front view of a safety device of the electrostatic air purifier according to the embodiment of the present invention, after the rear cover is removed.
Figure 11:
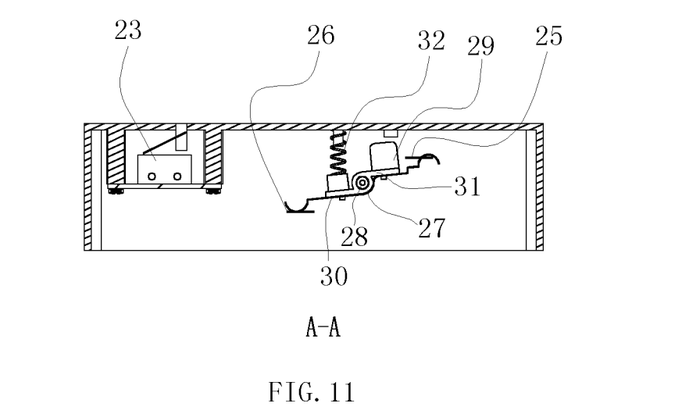
FIG. 11 is a sectional view in direction A-A of FIG. 10.
Figure 12:
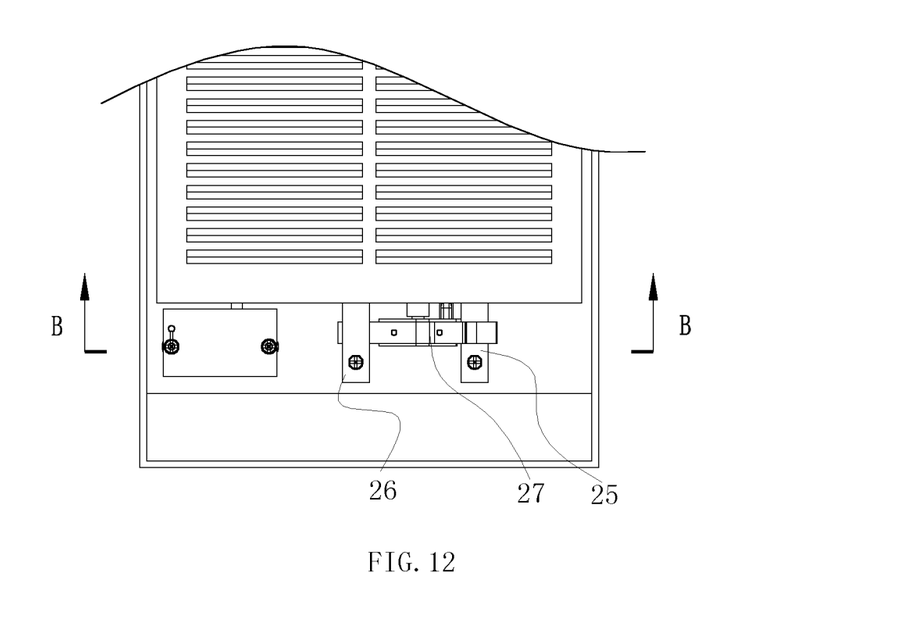
FIG. 12 is a front view of the safety device of the electrostatic air purifier according to the embodiment of the present invention, when the rear cover is attached.
Figure 13:
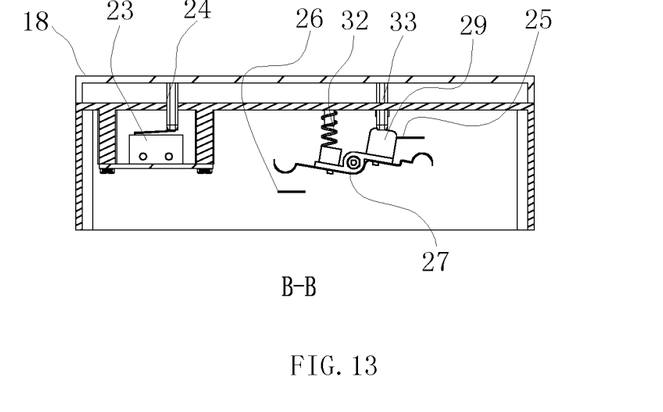
FIG. 13 is a sectional view in direction B-B of FIG. 12.

An electrostatic precipitator may form an electric field, and dust particles in air are charged by the corona effect when the dust in air passes through the electric field. An electrostatic precipitation device generally consists of a plurality of parallel electrode plates, with a high-voltage (e.g., several KV, generally 3-10 KV) power supply provided between the electrode plates to form an electric field. Charged dust particles are deflected under stress when passing through the electric field, and are eventually trapped on the electrode plates. The electrode plates are generally made of metal plates which are usually manufactured by sheet stamping. This structure has the following disadvantages: the assembly of the manufactured electrode plates is relatively troublesome because dozens of electrode plates are to be fixed and mounted one by one with a uniform interval, and it is thus difficult to control the process; in addition, since stamping parts may have many sharp edges and burrs, discharging tips will be formed when a high voltage is applied to the electrode plates, resulting in, on one hand, insufficient voltage and deteriorated performance, and on the other hand, the generation of excessive ozone which is harmful to the user's health. The electrode plates may be made of profiles. In this case, dozens of profiles are also to be fixed and mounted one by one, and the process is also cumbersome. Although the problem of burrs caused by stamping is solved and it is thus advantageous to the improvement of performance, the material cost is high. Some electrode plates may be made of plastic material. If material with a high conductivity is used, it is also likely to result in breakdown on two poles, decreased voltage and deteriorated performance; however, if material with a lower conductivity is used, it is likely to result in non-uniform electric field intensity and non-uniform absorption capacity if electrodes are not manufactured well. Moreover, since a contact is simply formed besides electrodes in the conventional design, as shown in FIG. 9a, the potential cross the two poles gradually decreases from a contact to a position away from the contact, so that the absorption performance is influenced.

In addition, in Chinese Patent CN204074260U (Application No.: 201320459622.1) entitled ELECTROSTATIC PRECIPITATION BOX, the material structure of electrode plates is improved in the disclosed precipitation box, the problems of ignition and the generation of ozone are thus avoided, and moreover uniform interval among the electrode plates is ensured. However, the electrode plates still need to be mounted one by one, and the mounting process is relatively complicated. Furthermore, in the electrostatic precipitation devices disclosed in Chinese Patent Application CN104689921A (Application No.: 201510065803.X) entitled ELECTROSTATIC PRECIPITATOR and Chinese Patent CN204583490U (Application No.: 201420794435.3) entitled PRECIPITATION UNIT AND ELECTROSTATIC AIR PURIFICATION DEVICE, electrode plates are to be mounted one by one, so that quick mounting of the electrode plates is not possible.

SUMMARY OF THE INVENTION

A first technical problem to be solved by the present invention is to provide an electrostatic precipitation module which can be assembled quickly, improves the uniformity of electric field distribution and has excellent electrostatic absorption performance.

A second technical problem to be solved by the present invention is to provide an electrostatic air purifier which is easy to assemble and produce and is excellent in absorption performance.

To solve the first technical problem, the electrostatic precipitation module comprises: a first connecting rib; a metal conductor embedded inside the first connecting rib along a length of the connecting rib; a plurality of conductive precipitation electrode plates connected to the first connecting rib and distributed along the length of the first connecting rib; a first set of connecting frames between which the plurality of conductive precipitation electrode plates and the first connecting rib are disposed to form a precipitation electrode plate module; a second connecting rib; a plurality of non-precipitation electrode plates connected to the second connecting rib and distributed along a length of the second connecting rib; and a second set of connecting frames between which the plurality of non-precipitation electrode plates and the second connecting rib are disposed to form a non-precipitation electrode plate module; wherein, the precipitation electrode plates are made from conductive plastic material by injection molding, and the metal conductor is embedded inside the first connecting rib by in-mold injection molding, the non-precipitation electrode plates are made from conductive plastic material by injection molding, the precipitation electrode plate module is placed parallel and adjacent to the non-precipitation electrode plate module such that the plurality of non-precipitation electrode plates and the plurality of conductive precipitation electrode plates are interlacedly disposed.

As an improvement, upper portions of the precipitation electrode plates protrude above the first set of connecting frames while lower portions thereof extend into the first set of connecting frames; upper portions of the non-precipitation electrode plates protrude above the second set of connecting frames while lower portions thereof extend into the second set of connecting frames.

Preferably, the first set of connecting frames is parallel plates of equal height.

Preferably, a first evading gap is formed on the precipitation electrode plate module at a position lining up with the second connecting rib; and a second evading gap is also formed on the precipitation electrode plate module at a position lining up with the second connecting rib.

As a further improvement, in the precipitation electrode plate module, the precipitation electrode plates are mounted inside a first insulating electrode plate positioning frame; and in the non-precipitation electrode plate module, the non-precipitation electrode plates are mounted inside a second insulating electrode plate positioning frame.

Preferably, the metal conductor of the precipitation electrode plate module is strip-shaped, and extends out from the first electrode plate positioning frame to form a first bent contact portion; and a second contact portion is provided on a surface of an outermost non-precipitation electrode plate in the non-precipitation electrode plate module to form a conductive one-piece member.

To solve the second technical problem, an electrostatic air purifier using any of electrostatic precipitation modules described above comprises:

a front shell with an air outlet and a rear cover with an air inlet, which are respectively used for sucking and exhausting air;

an electrostatic precipitation module is disposed within a space between the front shell and the rear cover and absorbs negatively charged dust particles in an air flow by static electricity;

a fan assembly is disposed between the front shell and the electrostatic precipitation module and used for facilitating the air flow to flow from the air inlet to the air outlet; and an anion emitter is disposed between the front shell and the fan assembly and used for emitting anions to ionize the dust particles in the air flow so that the dust particles are negatively charged.

Preferably, a middle frame for fixing the non-precipitation electrode plate module in the electrostatic precipitation module is disposed between the front shell and the rear cover.

Preferably, a microswitch is attached to a line connecting the electrostatic precipitation module to a high-voltage power supply; the microswitch connects to a first protrusion on the rear cover; and when the microswitch is turned on, after the rear cover is closed in place, the electrostatic precipitation module will be connected to the high-voltage power supply.

As an improvement, the first contact portion of the precipitation electrode plate module and the second contact portion of the non-precipitation electrode plate module are connected to an anode and a cathode of the high-voltage power supply through an elastic anode contact sheet and an elastic cathode contact sheet.

As an improvement, a rotatable discharge plate with a first end and a second end capable of rotating around a rotating axis is provided, and the elastic anode contact sheet and the elastic cathode contact sheet are respectively in contact corresponding to the first end and the second end of the discharge plate; a spring resists the second end of the discharge plate, so that the first end and the second end of the discharge plate can respectively keep contact with the elastic anode contact sheet and the elastic cathode contact sheet; a second protrusion of the rear cover pushes on the first end of the discharge plate to separate the first end and the second end of the discharge plate from the elastic anode contact sheet and the elastic cathode contact sheets; when the rear cover is removed, the first end of the discharge plate is no longer pushed by the second protrusion of the rear cover, so that the two ends of the discharge plate contact the elastic anode contact sheet and the elastic cathode contact sheets and the precipitation electrode plate module and the non-precipitation electrode plate module are connected for discharging.

Preferably, the discharge plate comprises a plastic baseplate with a top surface and a bottom surface, the discharge plate has an abutment portion disposed on the top surface of the plastic baseplate, and two metal shrapnel defining the first end and the second end of the discharge plate are both disposed on the bottom surface of the plastic baseplate.

Compared with the prior art, the present invention has the following advantages.

By providing a metal conductor for enhancing the electric field distribution inside the connecting rib, the electric field distribution of the precipitation electrode plate module and the non-precipitation electrode plate module becomes more uniform, improving electrostatic dust absorption performance. Moreover, integrally forming the precipitation electrode plate module and the non-precipitation electrode plate by an injection molding machine improves ease of manufacturing and one pole works as a one-piece member, unlike metal stamping parts which require individual assembly. The resulting simplification of production results in higher production efficiency.

By using in-mold injection molding, the production cost decreases.

There are no burrs and sharp edges on the plastic edges, and subsequent assembly of the electrode precipitation module is less hazardous to the user.

Plastic material does not require as much conductivity as metal, because a small resistance will not affect the performance of the whole precipitation module under a high voltage. Moreover, since the conductivity is lower than that of metal, the disadvantage of ignition by using metal electrode plates is eliminated.

With an anion emitter structure, the duct particles are ionized and then negatively charged and thus easier to be absorbed by the electrostatic precipitation module, so that air purification is improved and the air is freshened.

By additionally providing a safety protection device when the rear cover is opened, the electrostatic precipitation module is disconnected from the high-voltage power supply, and the precipitation electrode plate module and the non-precipitation electrode plate module are connected to safely discharge any accumulated voltage. This mechanism provides an extra layer of safety for a user. Furthermore, the safety protection device is simple, practical, easy to implement and low in cost.

DETAILED DESCRIPTION OF THE INVENTION

To enable a further understanding of the present invention content of the invention herein, refer to the detailed description of the invention and the accompanying drawings below:

FIGS. 1-6 show a preferred embodiment of the electrostatic precipitation module of the present invention. The electrostatic precipitation module comprises: a metal conductor 5; a first connecting rib 2; a plurality of conductive precipitation electrode plates 1; a first set of connecting frames 4; a second connecting rib 2'; and a plurality of non-precipitation electrode plates 10.

The electrostatic precipitation module is constructed as follows: the first connecting rib 2 in a middle position of the plurality of conductive precipitation electrode plates 1 and the plurality of precipitation electrode plates 1 is connected to the first connecting rib 2 and distributed along the length of the first connecting rib 2; and a first evading gap 3 is formed on the precipitation electrode plates 1 at a position lining up with the first connecting rib 2. If the overall height of the precipitation electrode plates 1 is 35 mm, the first connecting rib 2 has a height of 15 mm and the first evading gap 3 has a height of 20 mm. The precipitation electrode plates 1 are disposed in parallel between connecting frames 4. The connecting frames 4 are parallel plates of equal height. Upper portions of the precipitation electrode plates 1 protrude above the first set of connecting frames 4 while lower portions thereof extend into the first set of connecting frames 4. The precipitation electrode plates 1 are made from conductive plastic material by injection molding, and the metal conductor 5 for enhancing the electric field distribution is embedded inside the first connecting rib 2 by in-mold injection molding, so that a precipitation electrode plate module 9 is formed. The metal conductor 5 is strip-shaped. The conductive plastic material for the precipitation electrode plate module has a resistivity in an order of magnitude from $10^6$ to $10^9$ (in units of $\Omega \cdot m$). The precipitation electrode plate module 9 and the precipitation electrode plates 1 are mounted inside a first insulating electrode plate positioning frame 6, so that one end of the strip-shaped metal conductor 5 passes through a notch 7 of the first insulating electrode plate positioning frame 6 and then extends out from the first insulating electrode plate positioning frame 6 to form a first bent contact portion 8; the first contact portion 8 is recessed into the notch 7 of the first electrode plate positioning frame, substantially flush with the frame edge surface.

Correspondingly, the second connecting rib 2' is located in a middle position of the plurality of non-precipitation electrode plates 10 and the plurality of non-precipitation electrode plates 10 is connected to the second connecting rib 2' and distributed along the length of the second connecting rib 2'. A second evading gap 3 is formed on the non-precipitation electrode plates 10 at a position lining up with the second connecting rib 2'. If the overall height of the non-precipitation electrode plates 10 is 35 mm, the second connecting rib 2 has a height of 15 mm and the second evading gap 3 has a height of 20 mm. The non-precipitation electrode plates 10 are disposed in parallel between connecting frames 4; the connecting frames 4 are parallel plates with an equal height. Upper portions of the non-precipitation electrode plates 10 protrude above the second set of connecting frames 4 while lower portions thereof extend into the second set of connecting frames 4. The non-precipitation electrode plates 10 are made from conductive plastic material by injection molding, so that a non-precipitation electrode plate module 14 is formed. The metal conductor 5 is strip-shaped. The conductive plastic material for the precipitation electrode plate module has a resistivity in an order of magnitude from 10 to $10^5$ (in units of $\Omega \cdot m$). A second contact portion 11 is provided on a surface of an outermost non-precipitation electrode plate 10 in the non-precipitation electrode plate module 14 to form a conductive one-piece member. The non-precipitation electrode plate module 14 and the non-precipitation electrode plates 10 are mounted inside a second insulating electrode plate positioning frame 12, and a positioning port 13 is formed on the frame edge to expose the second contact portion 11, and the second contact portion 11 is substantially flush with the frame edge.

Figure 1:
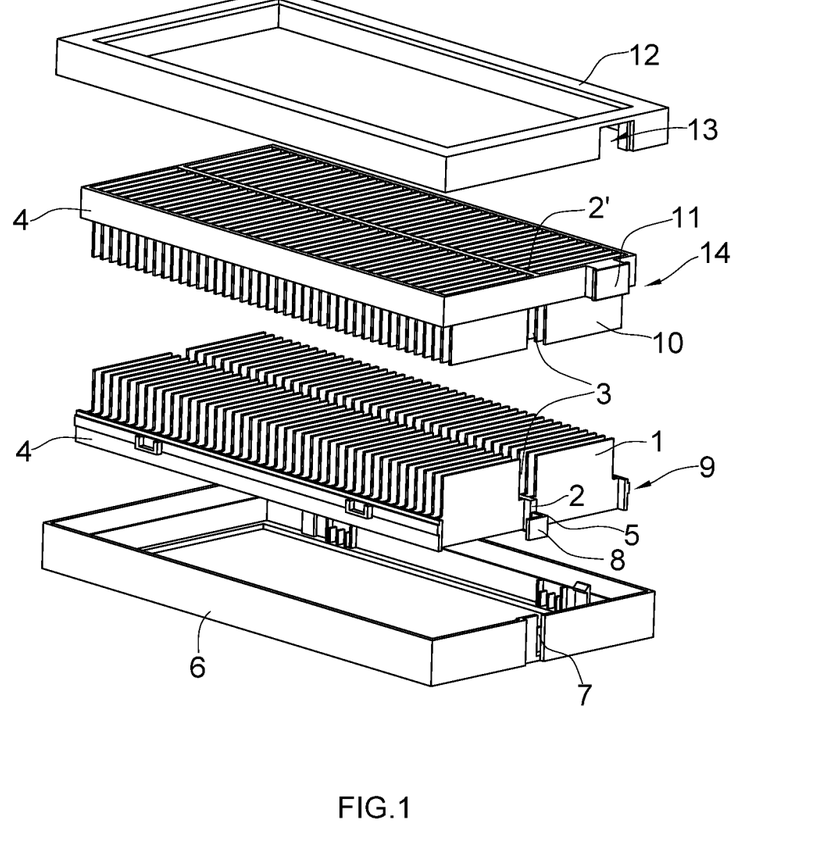
FIG. 1 is an exploded view of an electrostatic precipitation module according to an embodiment of the present invention.
Figure 2:
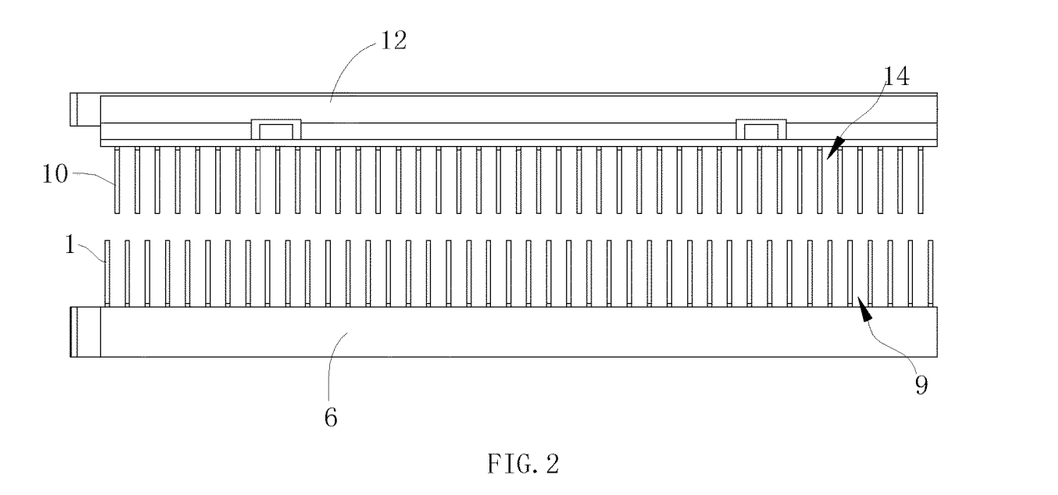
FIG. 2 is a side view of the electrostatic precipitation module according to the embodiment of the present invention (when the electrostatic precipitation module has not been closed)
Figure 3:
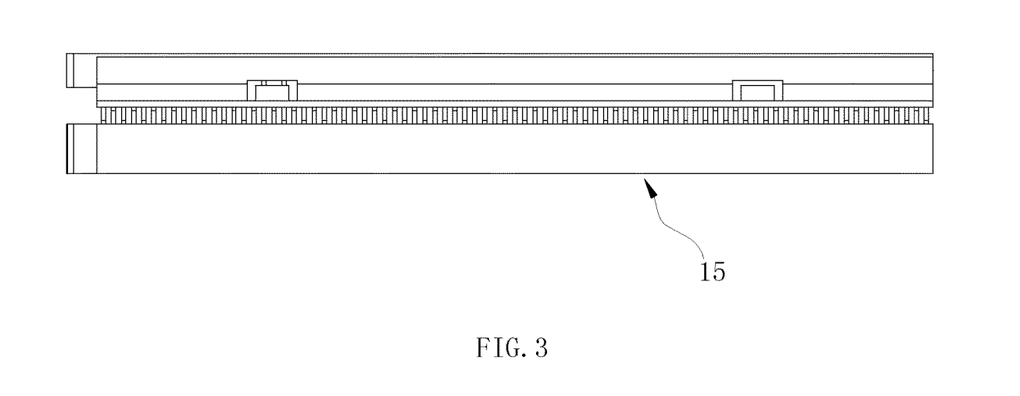
FIG. 3 is a side view of the electrostatic precipitation module according to the embodiment of the present invention (when the electrostatic precipitation module has been closed)
Figure 4:
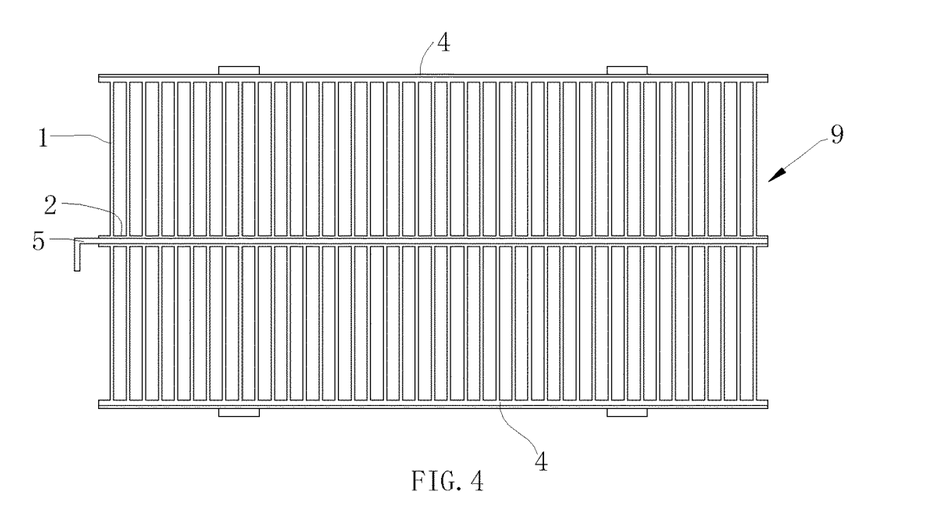
FIG. 4 is a top view of a precipitation electrode plate module of the electrostatic precipitation module according to the embodiment of the present invention.
Figure 5:
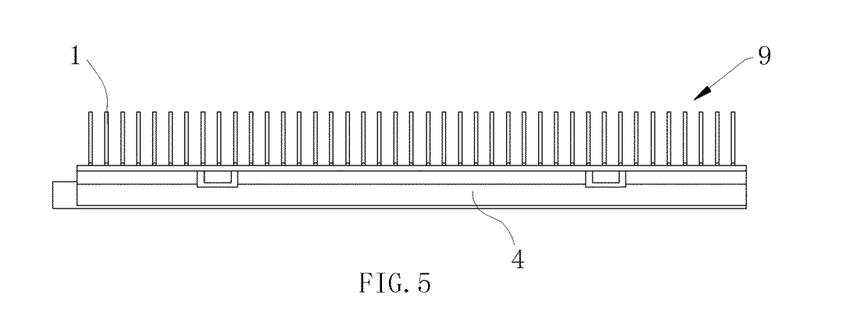
FIG. 5 is a front view of the precipitation electrode plate module of the electrostatic precipitation module according to the embodiment of the present invention.
Figure 6:
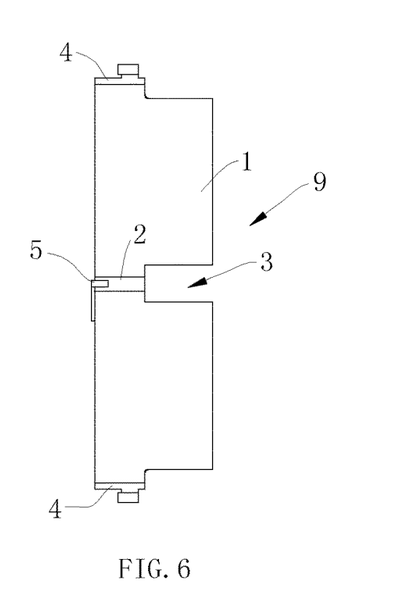
FIG. 6 is a side view of the precipitation electrode plate module of the electrostatic precipitation module according to the embodiment of the present invention.

After the precipitation electrode plate module 9 and the non-precipitation electrode plate module 14 are assembled relative to each other, the precipitation electrode plates 1 in the precipitation electrode plate module 9 and the non-precipitation electrode plates 10 in the non-precipitation electrode plate module 14 are alternately arranged at intervals so as to form an electrostatic precipitation module 15.

Figure 7:
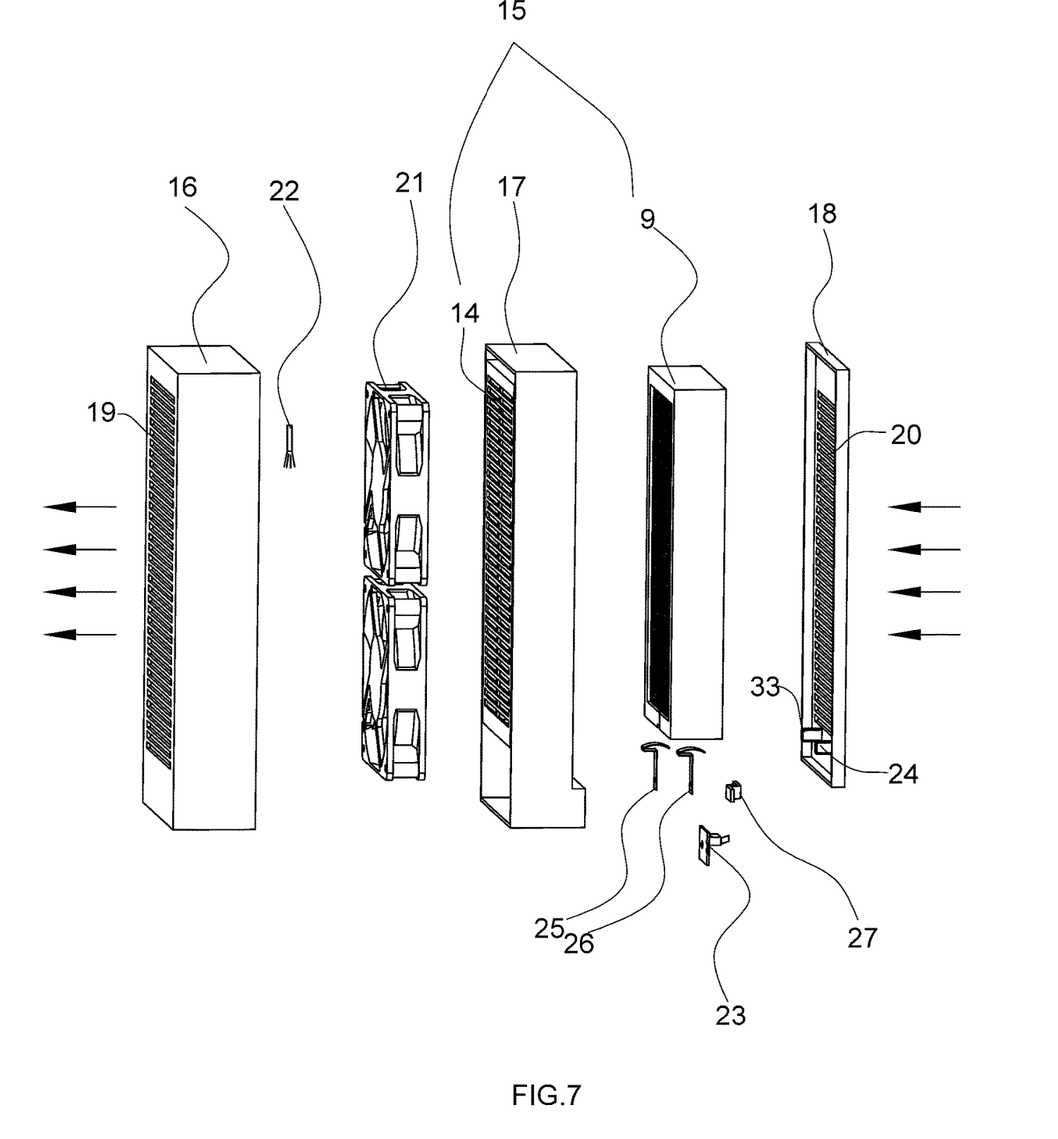
FIG. 7 is an exploded view of an electrostatic air purifier according to the embodiment of the present invention.

As shown in FIG. 7, an electrostatic air purifier using the electrostatic precipitation module is provided, comprising a housing consisting of a front shell 16, a middle frame 17 and a rear cover 18. The front shell 16 is provided with an air outlet 19 for exhausting air, and the rear cover 18 is provided with an air inlet 20 for sucking air. The electrostatic precipitation module 15 is disposed between the front shell 16 and the electrostatic precipitation module 15 and used for facilitating the air flow to flow from the air inlet 20 to the air outlet 19 by high-voltage static electricity 3 to 10 KV (preferably 5 KV). Preferably, the middle frame 17 for fixing the non-precipitation electrode plate module 14 in the electrostatic precipitation module 15 is disposed between the front shell 16 and the rear cover 18. The precipitation electrode plate module 9 is in the space between the middle frame 17 and the rear cover 18. A fan assembly 21 is disposed between the front shell 16 and the electrostatic precipitation module 15 and used for facilitating the air flow to flow from the air inlet 20 to the air outlet 19. An anion emitter 22 is disposed between the front shell 16 and the fan assembly 21 and used for emitting anions to ionize the dust particles in the air flow so that the dust particles are negatively charged. Thus, the electrostatic air purifier of the present invention is formed.

Figure 8:
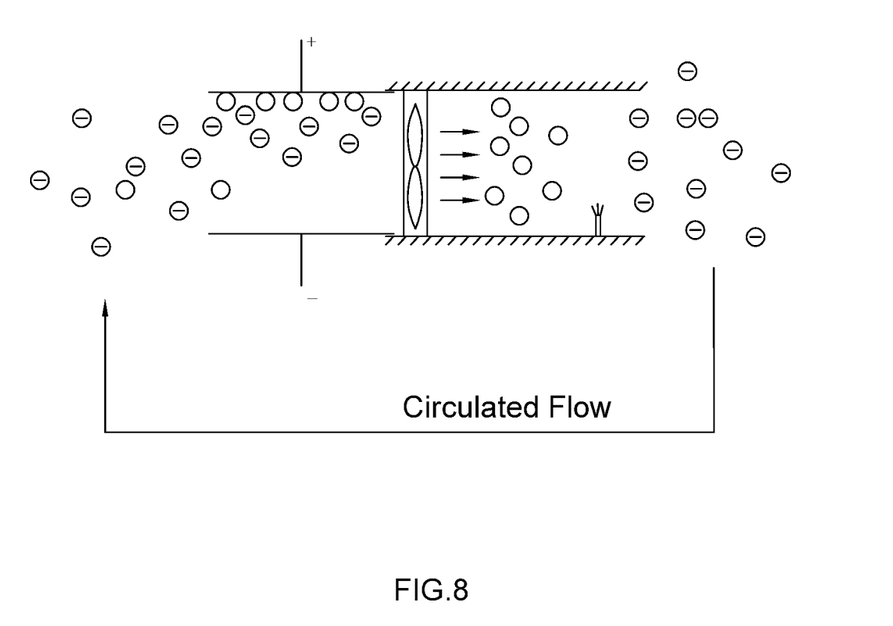
FIG. 8 is a basic principle diagram of the electrostatic air purifier according to the embodiment of the present invention.

The basic working principle is as follows: anions are released at the air outlet 19 to ionize dust particles in air; when these charged particles are circulated to the plastic precipitation electrode plates 1 or non-precipitation electrode plates 10, the charged particles will be absorbed by the anode (or an earth pole), so that air is purified, as shown in FIG. 8.

A safety device is additionally provided inside the electrostatic air purifier. As shown in FIGS. 10-15, a microswitch 23 is attached to a line connecting the electrostatic precipitation module 15 to the high-voltage power supply. The microswitch 23 is fixed on a printed circuit board within a switch base with a through hole. The microswitch 23 connects to a first protrusion 24 on the rear cover 18. The microswitch 23 is turned on when the rear cover 18 is closed in place and the electrostatic precipitation module 15 is thereby connected to the high-voltage power supply. When the rear cover 18 is opened, the first protrusion 24 on the rear cover 18 is separated from the microswitch 23, and the electrostatic precipitation module 15 is disconnected from the high-voltage power supply, so that a user is prevented from contacting the electrostatic precipitation module 15 while it is connected to the high-voltage power supply.

Further, the first contact portion 8 of the precipitation electrode plate module 9 and the second contact portion 11 of the non-precipitation electrode plate module 14 are connected to an anode and a cathode of the high-voltage power supply through an elastic anode contact sheet and an elastic cathode contact sheet 25,26. A rotatable discharge plate 27 with a first end and a second end capable of rotating around a rotating axis is rotatably fixed within the housing via a shaft pin 28. The discharge plate 27 comprises a plastic baseplate 31 with a top surface and a bottom surface, the discharge plate 27 has an abutment portion 29 disposed on the top surface of the plastic baseplate 31, and two metal shrapnel 30 defining the first end and the second end of the discharge plate 27 are both disposed on the bottom surface of the plastic baseplate 31. A spring 32 pushes the second end of the discharge plate 27 at the position adjacent to the rotating axis of the discharge plate 27, so that the first end and the second end of the discharge plate 27 keep contact, respectively, with the elastic anode contact sheet and the elastic cathode contact sheet 25,26. A second protrusion 33 of the rear cover 18 pushes on the first end of the discharge plate 27 at a position adjacent to the rotating axis of the discharge plate 27 to separate the first end and the second end of the discharge plate 27 from the elastic anode contact sheet and the elastic cathode contact sheets 25,26. When the rear cover 18 is attached, the second protrusion 33 of the rear cover 18 pushes the first end of the discharge plate 27 against the torque exerted on the second end of the discharge plate 27 by the spring 32. This electrically separates the high-voltage anode and cathode contact sheets 25,26 from the precipitation electrode plates 1 and the non-precipitation electrode plates 10, enabling the high voltage power supply to operate. When the rear cover 18 is removed, the first end of the discharge plate 27 is no longer stopped by the second protrusion 33 of the rear cover 18, so that the two ends of the discharge plate 27 contact the elastic anode contact sheet and the elastic cathode contact sheet 25,26. The precipitation electrode plate module 9 and the non-precipitation electrode plate module 14 are electrically connected for discharging. Thus, the user is prevented from getting shocked by residual charges from the electrostatic precipitation module 15. FIG.

Figure 14:
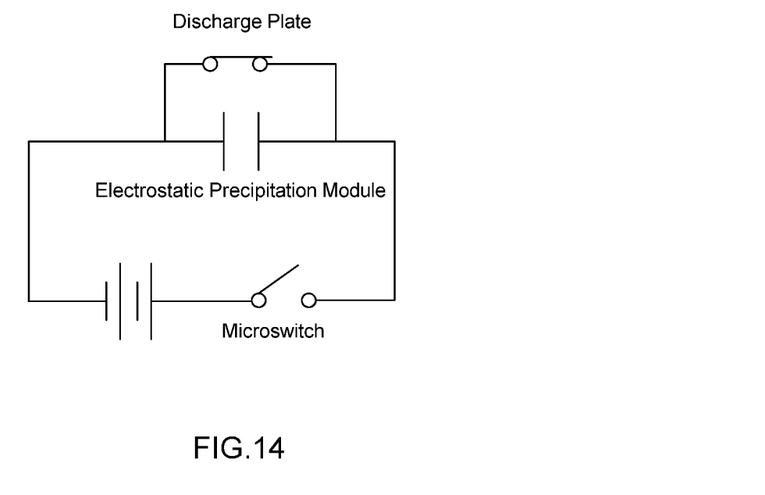
FIG. 14 is a schematic circuit diagram of the safety device of the electrostatic air purifier according to the embodiment of the present invention, when the rear cover is removed.
Figure 15:
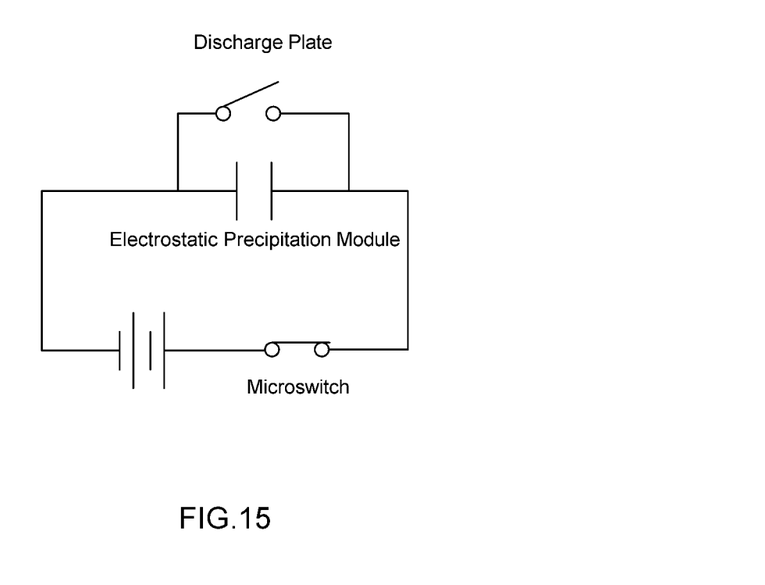
FIG. 15 is a schematic circuit diagram of the safety device of the electrostatic air purifier according to the embodiment of the present invention, when the rear cover is attached.

14 is a schematic circuit diagram of the safety device of the electrostatic air purifier according to the embodiment of the present invention when the rear cover is removed. FIG. 15 is a schematic circuit diagram of the safety device of the electrostatic air purifier according to the embodiment of the present invention when the rear cover is attached.

The scope of the present invention is not limited to each embodiment described in this description. Any changes and replacements made on the basis of the scope of the present invention patent and of the description shall be included in the scope of the present invention patent.

The invention claimed is:

1. An electrostatic precipitation module, comprising:
   a first connecting rib;
   a metal conductor embedded inside the first connecting rib along a length of the first connecting rib;
   a plurality of conductive precipitation electrode plates connected to the first connecting rib and distributed along the length of the first connecting rib;
   a first set of connecting frames between which the plurality of conductive precipitation electrode plates and the first connecting rib are disposed to form a precipitation electrode plate module;
   a second connecting rib;
   a plurality of non-precipitation electrode plates connected to the second connecting rib and distributed along a length of the second connecting rib; and
   a second set of connecting frames between which the plurality of non-precipitation electrode plates and the second connecting rib are disposed to form a non-precipitation electrode plate module,
   wherein, the precipitation electrode plates are made from conductive plastic material by injection molding, and the metal conductor is embedded inside the first connecting rib by in-mold injection molding,
   the non-precipitation electrode plates are made from conductive plastic material by injection molding,
   the precipitation electrode plate module is placed parallel and adjacent to the non-precipitation electrode plate module such that the plurality of non-precipitation electrode plates and the plurality of conductive precipitation electrode plates are interlacedly disposed.

2. The electrostatic precipitation module of claim 1, wherein
   a first portion of the precipitation electrode plates extending from the first set of connecting frames and a second portion of the precipitation electrode plates surrounded by the first set of connecting frames;
   a first portion of the non-precipitation electrode plates extending from the second set of connecting frames and a second portion of the precipitation electrode plates surrounded by the second set of connecting frames.

3. The electrostatic precipitation module of claim 2, wherein the first set of connecting frames are parallel plates with an equal height.

4. The electrostatic precipitation module of claim 1, wherein a first evading gap is formed on the precipitation electrode plate module at a position lining up with the first connecting rib; and
   a second evading gap is also formed on the precipitation electrode plate module at a position lining up with the second connecting rib.

5. The electrostatic precipitation module of claim 1, wherein in the precipitation electrode plate module, the precipitation electrode plates are mounted inside a first insulating electrode plate positioning frame; and in the non-precipitation electrode plate module, the non-precipitation electrode plates are mounted inside a second insulating electrode plate positioning frame.

6. The electrostatic precipitation module of claim 5, wherein the metal conductor of the precipitation electrode plate module extends out from the first insulating electrode plate positioning frame to form a first bent contact portion; and a second contact portion is provided on a surface of an outermost non-precipitation electrode plate in the non-precipitation electrode plate module to form a conductive one-piece member.

* * * * *